United States Patent
Hammen et al.

(10) Patent No.: US 9,870,431 B2
(45) Date of Patent: Jan. 16, 2018

(54) METHOD AND DEVICE FOR CONTROLLING THE ACCESS TO KNOWLEDGE NETWORKS

(75) Inventors: Clara Hammen, Darmstadt (DE); Jan Schümmer, Neu-Anspach (DE); Ralf Rath, Vieuheim (DE); Hans Scholz, Darmstadt (DE); Christian Schuckmann, Darmstadt (DE); Elke Siemon, Darmstadt (DE); Patrick Closhen, Darmstadt (DE)

(73) Assignee: INTELLIGENT VIEWS GMBH, Darmstadt (DE)

( * ) Notice: Subject to any disclaimer, the term of this patent is extended or adjusted under 35 U.S.C. 154(b) by 934 days.

(21) Appl. No.: 12/136,058

(22) Filed: Jun. 10, 2008

(65) Prior Publication Data

US 2008/0275879 A1 Nov. 6, 2008

Related U.S. Application Data

(63) Continuation-in-part of application No. 10/512,778, filed as application No. PCT/EP03/04373 on Apr. 28, 2003, now abandoned.

(30) Foreign Application Priority Data

Apr. 26, 2002 (DE) .................................. 102 18 905

(51) Int. Cl.
G06F 17/30 (2006.01)
G06F 21/62 (2013.01)

(52) U.S. Cl.
CPC .. *G06F 17/30958* (2013.01); *G06F 17/30961* (2013.01); *G06F 21/6218* (2013.01)

(58) Field of Classification Search
CPC ......... G06F 17/30961; G06F 17/30958; G06F 21/6218; G06F 17/30091; G06F 17/30327
USPC ....................................... 707/783, 785, 786
See application file for complete search history.

(56) References Cited

U.S. PATENT DOCUMENTS 7,185,359 B2* 2/2007 Schmidt et al. .................. 726/2
2004/0186845 A1* 9/2004 Fukui ................ G06F 17/30327
707/999.1

* cited by examiner

*Primary Examiner* — Vincent F Boccio
(74) *Attorney, Agent, or Firm* — Perkins Coie LLP

(57) ABSTRACT

The invention relates to an efficient system for user rights in a semantic digital network, whereby users are arranged in the same semantic network as the information objects. The rights are thus derived from the semantic relations between users and information objects in a common semantic network.

9 Claims, 2 Drawing Sheets

METHOD AND DEVICE FOR CONTROLLING THE ACCESS TO KNOWLEDGE NETWORKS

CROSS REFERENCE TO RELATED APPLICATIONS

Figure 1:
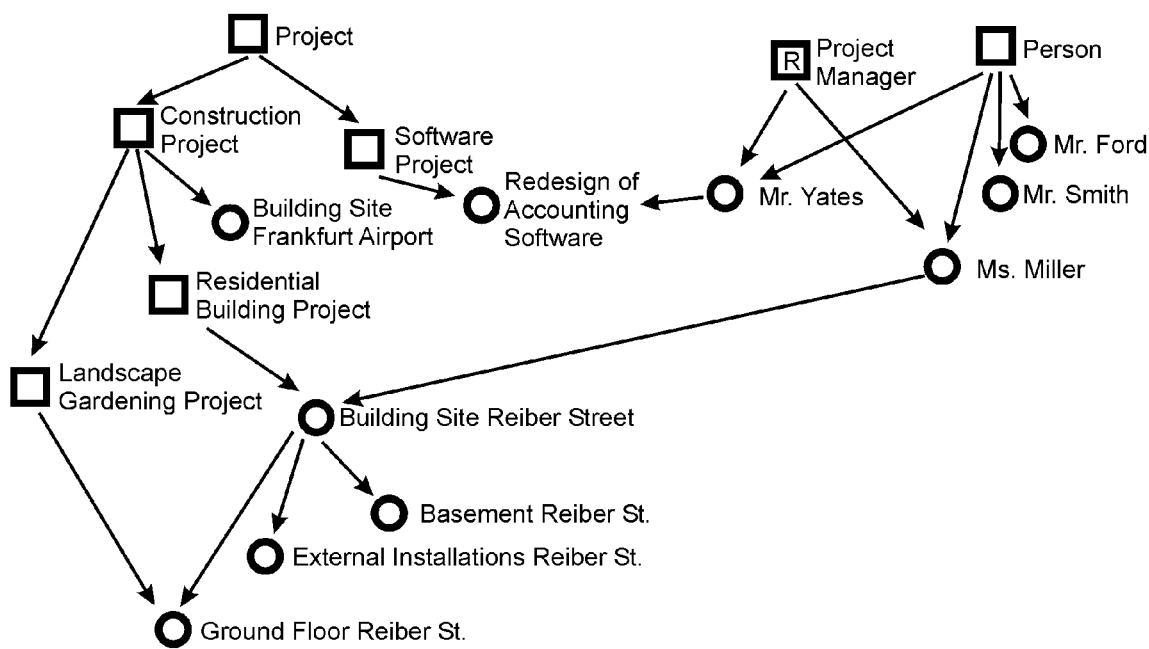

This application is a continuation-in-part of U.S. patent application Ser. No. 10/512,778 filed Oct. 26, 2004, now abandoned which is a national phase entry of PCT/EP03/04373 filed Apr. 28, 2003, which claims priority to DE 102 18 905.6 filed Apr. 26, 2002, all of which are incorporated by reference.

TECHNICAL FIELD

The invention relates essentially to a method for deriving user rights in a semantic network.

BACKGROUND OF THE INVENTION

Semantic networks are being used in increasing numbers to link information items with one another and to find them again at a later time. These forms of networks with their algorithms are also referred to as knowledge networks or ontologies, whereby information objects are connected with one another by edges which exhibit specific semantics.

Navigation through the network is effected along these edges and for preference by means of inferential algorithms. These traverse the network in the quest for statements.

Because of the large variety of information possibly stored in such knowledge networks, the need arises for access to be restricted or made possible to specific areas of the network under certain circumstances.

In the considerations regarding the structure of the user management, criteria such as efficiency and usability of existing algorithms and data structures play a decisive part.

Known solutions implement the access control on the table level, as it is known, for example, from relational databases.

The problem addressed by the invention is to provide an efficient and flexibly configurable access control which is technically and ergonomically integrated, and which takes account of the complexity of knowledge networks.

U.S. Pat. No. 5,941,947 discloses a method to control the access to network resources. This approach uses a relational database to store the access information. Furthermore the rights are stored explicitly and not as rules, which are executed at runtime. Furthermore the rights are used to control the access of the objects which are located externally. Furthermore U.S. Pat. No. 5,941,947 discloses a tight relation between User-Groups and data-categories.

US 2003/0126136 A1 discloses a framework and a semantic network

DETAILED DESCRIPTION

This problem is resolved by the invention in accordance with the features of the independent claims. Advantageous further embodiments of the invention are described in the sub-claims.

If the invention is regarded in abstract terms, the users are represented in the same semantic network as the information objects. Access rights are derived from the semantic relations between users and information objects.

This solution has the advantage that no further metadata is required, as is the case, for example, with relational databases. Rather, existing algorithms and inference rules can be used in order to derive user rights. In addition to this, the same storage system can be used for contents and access information. A further technical advantage lies in the fact that no adaptation of the code for the representation of the access information is required. The users and their relations to the information objects are part of the knowledge network as a whole.

Thanks to the use of the efficient memory system and the high-performing algorithms, it is possible for the user rights to be calculated at the time of access. This has the advantage that, instead of static rules, access rights can be defined in the form of queries that are executed dynamically. This is described in detail hereinafter.

The rights system of the present invention makes the decision on access authorization by evaluating a set of access rules with information from the knowledge network.

Users who are intended to be subject to an access control by the rights system are presented as nodes in the knowledge network.

These user nodes are set in relationship to other nodes in the knowledge network.

By means of the rules which configure the rights system it is determined which access rights pertain for the individual user for the knowledge network objects. In this situation a check is carried out as to whether rules exist which allow for an access. This check is performed dynamically at run time. This ensures that any changes in the knowledge network are immediately reflected in changed access rights.

Roles are likewise defined in the knowledge network and simplify the configuration of the rights system. Depending on the role of a person, it is therefore possible for different rights to be defined for entire groups.

Considered in formal terms, an access a: $<u, t, op>$ is a triple consisting of the three components user, target, and operation.

A decision d: {grant/deny} states whether an access may be performed or not. A right r: a→d is a mapping of an access to a decision (grant or deny).

'grant' means that the user of a right (user) can carry out the operation specified (operation) on the target of the access (target). If a part of the access is not defined, the access is deemed to apply to all the objects of the knowledge network which come into question for this part. In addition to the specification of individual elements, the components can contain sets of elements. As a result, it is possible to define access rights for groups of users on sets of elements with multiple operations.

In the preferred embodiment, the rights of a knowledge network are defined in a rights tree. The root of this tree is for preference anchored in the central part of the knowledge network. If no rights tree exists in this preferred embodiment, or if this space consists solely of a root node, a default decision, preferably "grant", is returned for all users on all knowledge network objects.

Rights are defined in the inner nodes and in the leaves of the rights tree. The inner nodes act as filter for the access(es) that have to be granted or denied. When an access passes all filter levels of the access rights tree and reaches a leaf in the tree, 'grant' or 'deny' is returned as permission for this access.

Components of an Access

The individual components of an access are explained hereinafter. The components of the rule system, especially the different types of filters, will then be considered.

Operations:

The definition of op in the rights system is effected for preference by the enumeration of the permitted operations (in the preferred implementation "Read", "Modify", "Generate" and "Delete").

User:

Persons (or external systems) that need to access the knowledge network are themselves stored as nodes in the network. There is an explicit mapping between users (preferably login names) and user objects. User objects can be linked to other nodes of the knowledge network.

Target:

In the preferred embodiment, any element of the knowledge net can be target t of an access. Especially, target can be
- A semantic node (such as an address, a customer, an order)
- A user object as a specialisation of semantic node
- An attribute of a semantic object (such as the date of birth of a certain person, the street name of an address)
- A relation between semantic nodes (such as the 'placed order' relation between customer object 'Miller' and order object '67103/03').

Components of the Rule System

Access right rules are organized as a hierarchy (or tree) of filters. Each filter applies to one or more well defined aspects of an access. Each filter can be configured as positive or negative filter. For a positive filter, the filter condition has to evaluate to 'true' for an access to let this access pass to the next lower level. Negative filters have their condition evaluate to 'false' to let an access pass thru. In the preferred embodiment, different filtering behaviour is reflected in different types of filters:

1. Explicit Itemization:

The users or target objects are configured in the filter explicitly, e.g. by means of an editor. In this situation, individual elements (instances) of the user or target term are determined.

For example, if some access rules should apply only for user 'bob', an explicit filter for access parameter u and configured object 'bob' is inserted in the rules tree on top of the rules describing user bob's special rules.

2. Calculation by a Query Expression

In this case, the filter rule is described by a query expression. If the subject of the filter, namely the target or the user of an access, is contained in the result set of the query, the filter condition evaluates to 'true'.

If it is intended, for example, that in a knowledge network with project data only the knowledge network objects should be accessible for each owner/user from their own project in each case, this can be attained by setting up a query for 'projects owned by the current user' as target filter.

3. Restriction to Certain Types of Attributes or Relations

This filter works only for targets of an access. The relation or attribute types that match this filter are configured explicitly. In contrast to filter type 1 which would apply to explicit attributes/relations (e.g. the attribute "date of birth" of person "Adele"), this filter applies to types of attributes/relations (e.g. all "date of birth" attributes).

Evaluation of Access Requests

When accessing an information object, the computer on which the invention is running (client, middleware or server) automatically generates an access and evaluates the said right tree with that access.

During the examination of whether an access may be carried out, the rule tree is traversed in pre-order. If an access is filtered out by an inner node n1, this node's sub tree is not traversed in further depth, and traversal is continued with the neighbour of n1. When the traversal reaches a leaf of the rule tree, the decision configured for that leaf is returned as result for the access request.

Configuration of Access Rights

The right tree itself is protected against unauthorized manipulation. Standard users may have only read access to check concrete access request, whereas administrators have also the right to change the rights and its rules. To provide only a limited access to the right tree, the right tree has limited entry points which are protected by dedicated interfaces or functions or layers of software.

Example Embodiments

The invention is explained in greater detail hereinafter on the basis of embodiments, which are represented in diagrammatic form in the Figures. The same reference numbers in the individual Figures designate the same elements.

SPECIFICALLY, THE FIGURES SHOW

Figure 2:
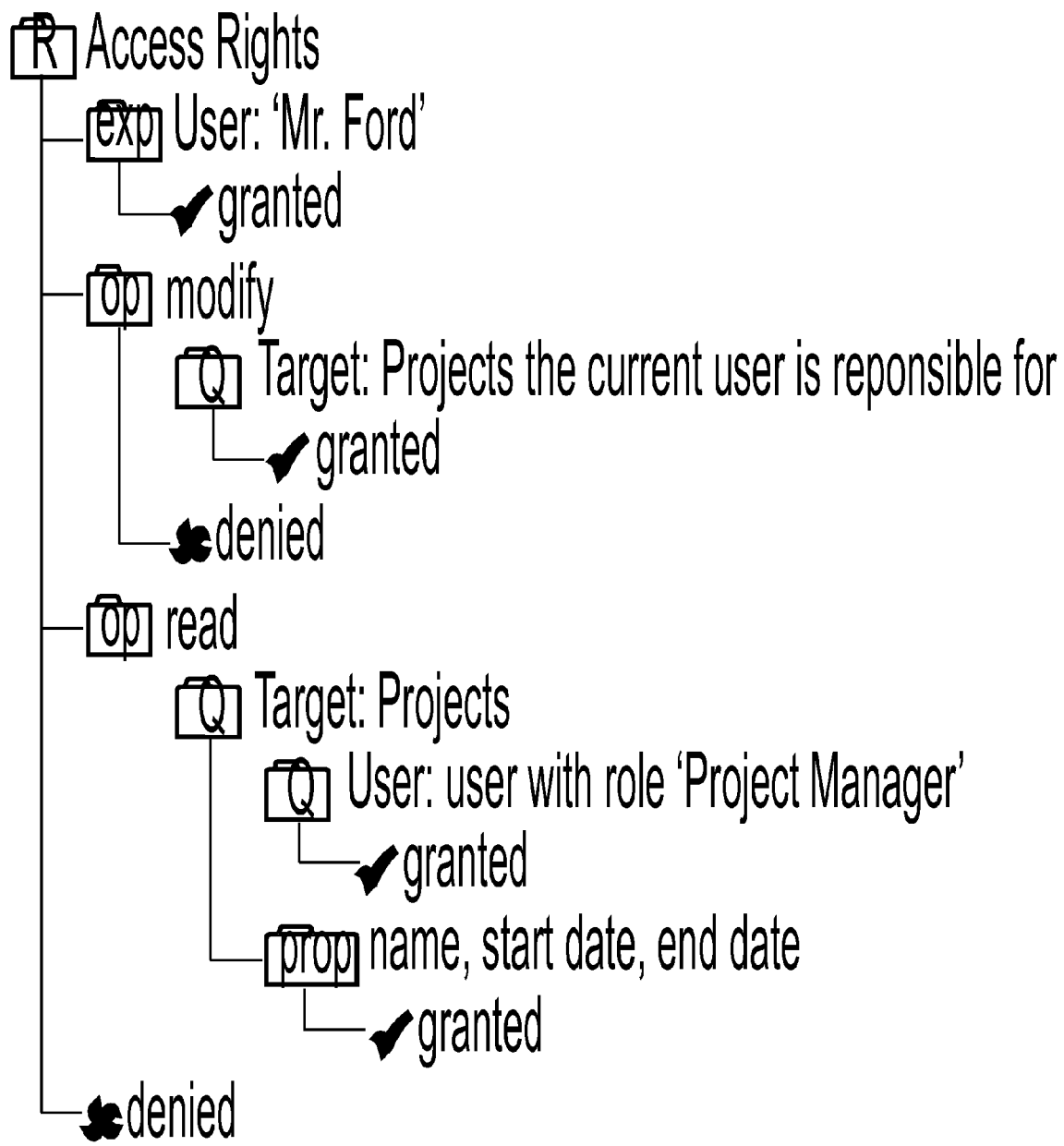

FIG. 1 An extract from a knowledge network with the user/owner nodes "Ms. Miller", responsible for the knowledge network object "Building Site Reiber Street";

FIG. 2 Rights in tree form with operations folders and user/owner folders;

DESCRIPTION OF THE PREFERRED EMBODIMENT

Within the scope of the invention, numerous derivations and further formulations of the embodiments described can be realised.

FIG. 1 shows a section from a knowledge network, in which the project structure of a construction company is displayed. Accordingly, "Ms. Miller" is responsible for the project of the "Reiber Street Residential Building", in the role of "Project Manager". "Mr. Yates" is leading the Software Project "Redesign Accounting System".

The rights system can now be configured in such a way, for example, that Ms. Miller receives writing rights to the building sections relating to the "Building Site Reiber Street" construction project (e.g. "Basement Reiber St."). Construction sections from other construction projects (e.g. "Building Site Frankfurt Airport"), for which Ms. Miller is not responsible, cannot be processed by her. New construction sections, such as in the sector of "Reiber Street External Installations", automatically fall into the access area of Ms. Miller.

Changes in the knowledge network, such as a restructuring, in which the responsibilities for "Residential Building" and "Landscape Gardening" are separated in terms of organization, also automatically change the access entitlements of the users concerned (in this case, Ms. Miller would lose her writing right to the "External Installations"). "Mr. Ford" (being the company owner) has global access rights to all nodes of the knowledge network.

An example of an access rights configuration can bee seen in FIG. 2.

The first part tree of the access rights tree explicitly grants global access to "Mr. Ford".

The second sub tree defines access rights for the operation "modify" for all users (except "Mr. Ford"). If the target of the operation is a project within the responsibility of the current user, modification is allowed. For all other nodes (e.g. a project node outside the user's responsibility, or the person node "Mr. Yates"), access is denied.

The third sub tree defines read access rights. If the node to be read is of type "Project", read access is granted to all users with role "Project Manager". E.g., "Mr. Yates" can read all aspects of any project. For all other users (like "Mr. Smith"), read access is restricted to the basic properties of a project (project name, start date, and end date in our example). For all other knowledge nodes, read access is denied by the fallback "denied" at the bottom of the rights tree.

The bottommost leaf of the rights tree defines the default answer of the access rights system when none of the previous rules apply ("denied" in FIG. 2). In the example, no rules are defined for the "Create" operation, so the only one allowed to create any knowledge object is "Mr. Ford", because of the "grant" in the first part tree which applies regardless the requested operation.

LITERATURE LIST

1. Knowledge Engineering: Principles and Methods (Rudi Studer, V. Richard Benjamins, and Dieter Fensel).
2. Fausto Rabitti, Elisa Bertino, Won Kim, and Darrell Woelk: A Model of Authorization for Next-Generation Database Systems, in: ACM Transactions on Database Systems, Vol. 16, No. 1, March 1991.
3. Martin S. Olivier and Sebastian H. von Solms: A Taxonomy for Secure Object-Oriented Databases, in: ACM Transactions on Database Systems, Vol. 19, No. 1, March 1994.
4. Gail-Joon Ahn and Ravi Sandhu: Role-Based Authorization Constraints Specification, in: ACM Transactions on Information and System Security, Vol. 3, No. 4, November 2000.
5. Elias Bertino, Sushil Jajodia, and Pierangela Samaratia: Flexible Authorization Mechanism for Relational Data Management Systems, in: ACM Transactions on Information Systems, Vol. 17, No. 2, April 1999.
6. John F. Sowa: Knowledge Representation: Logical, philosophical, and computational foundations. Brooks/Cole Publishing House, 2000.
7. And other references disclosed in the documents referred to above.

The invention claimed is:

1. A Method for controlling access rights to information objects in a semantic network stored in a digital storage medium, which comprises nodes and edges, constituting a multidimensional network, whereby the nodes represent information objects and the edges represent semantic relations, wherein the semantic network is traversed along the edges, and wherein each edge is defined by a type to exhibit specific semantics, wherein
  a) users or user groups are stored as nodes in said semantic network, wherein
  b) users or user groups are set in relationship with other information objects in said semantic network,
  c) access rights are defined, configured and stored in the form of freely definable, changeable and a searchable hierarchy of access rules in a separate data structure which relates to the objects and semantic relations in the semantic network, wherein the rules are by an administrator,
  d) requests to the access right system are described by the requesting user (u), the semantic object the user requests to access (t), and the operation (op) the user requests to perform on t, wherein target t of an access can be any element of the knowledge net comprising semantic nodes, attributes of a semantic nodes, and relations between semantic nodes,
  e) access permissions to access a semantic object by a user are computed dynamically on demand by traversal of the hierarchy of rules from the top to the bottom and checking the rules in the order of the hierarchy with the request d) to determine if an access is allowed or denied in the moment of the access to the object when performing an operation on the object by the user, wherein
    each rule comprises inner nodes of the rule hierarchy and the inner nodes are related to one either the requesting user, the target, or the operation of the request d), and
    each inner node act as filter for the applicability of the rule,
    leaves of the hierarchy define if any request that has reached the leaf and therefore was not filtered out by previous inner nodes is granted or denied, and
    the order of the hierarchy defines the first applicable rule even if more than one potentially matching rule is present in the hierarchy.

2. The Method according to claim 1, wherein a right is defined by a function r: <u, t, op>→{grant|deny}, whereby the right is composed of the components of user, target object, and operation, and wherein an user (u) of the right may or may not be allowed to carry out the operation (op) on a target object (t).

3. The Method according to claim 1, wherein the access rules are defined in a hierarchy of filters such that access rules defined in sub trees of a given filter only apply to those access requests passing the filter.

4. The Method according to claim 3, wherein the filter criterion is determined explicitly.

5. The Method according to claim 3, wherein the filter criterion is determined by a search query in the semantic network.

6. The Method according to claim 3, wherein the filter criterion is determined by the type of the target (t).

7. The Method according to claim 1, wherein during the examination as to whether an access may be carried out, all the sub trees of the rights tree are run through in pre-order for as long as required until the response from a sub tree provides an answer; by contrast, if no sub tree is found, a default response is returned.

8. The Method according to claim 7, wherein traversal of sub trees is skipped if an access request is filtered out by the root node of the sub tree.

9. A computer-readable medium having stored thereon instructions to execute the method according claim 1.

* * * * *